US010063550B2

(12) United States Patent
Sun et al.

(10) Patent No.: US 10,063,550 B2
(45) Date of Patent: *Aug. 28, 2018

(54) METHOD AND SYSTEM FOR REALIZING PRESENCE SERVICE, PRESENCE INFORMATION PROCESSING DEVICE AND PRESENTITY CLIENT

(71) Applicant: Huawei Technologies Co., Ltd., Shenzhen (CN)

(72) Inventors: Qian Sun, Shenzhen, CA (US); Yang Zhao, Shenzhen (CN); Chenghui Peng, Shanghai (CN); Linyi Tian, Shenzhen (CN); Hongqing Bao, Shenzhen (CN); Xuefei Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 866 days.

This patent is subject to a terminal disclaimer.

(21) Appl. No.: 14/057,582

(22) Filed: Oct. 18, 2013

(65) Prior Publication Data
US 2014/0047515 A1 Feb. 13, 2014

Related U.S. Application Data

(63) Continuation of application No. 11/944,712, filed on Nov. 26, 2007, now Pat. No. 8,595,309, which is a
(Continued)

(30) Foreign Application Priority Data

Mar. 24, 2006 (CN) .......................... 2006 1 0034669
May 1, 2006 (CN) .......................... 2006 1 0080044

(51) Int. Cl.
*G06F 15/16* (2006.01)
*H04L 29/06* (2006.01)
(Continued)

(52) U.S. Cl.
CPC ............ *H04L 63/10* (2013.01); *H04L 63/104* (2013.01); *H04L 67/24* (2013.01); *H04L 51/04* (2013.01); *H04L 63/08* (2013.01)

(58) Field of Classification Search
CPC ... H04L 51/04; H04L 51/043; H04L 51/5815; H04L 12/581; H04L 67/24; H04L 29/08684
(Continued)

(56) References Cited

U.S. PATENT DOCUMENTS 6,658,095 B1 * 12/2003 Yoakum .................. H04L 12/66
379/106.01
7,969,993 B2 6/2011 Shimamura et al.
(Continued)

FOREIGN PATENT DOCUMENTS

CN 1520089 8/2004
CN 1526246 A 9/2004
(Continued)

OTHER PUBLICATIONS

Rosenberg, J., "Presence Authorization Rules draft-ietf-simple-presence-rules-01", IETF, http://tools.ietf.org/html/draft-ietf-simple-presence-rules-01, Accessed: Oct. 19, 2009, Published: Oct. 25, 2004.*
(Continued)

*Primary Examiner* — Nam T Tran
(74) *Attorney, Agent, or Firm* — Slater Matsil, LLP

(57) ABSTRACT

A method for processing presence information is disclosed. Presence information includes different values of a presence element, classes corresponding to the values and presentity information. Authentication configuration information of a presentity is obtained according to the presentity information. A right rule is obtained by resolving the authentication configuration information. The right rule includes a corre-
(Continued)

lation configured by the presentity between a watcher identity and a class of a group that the watcher identity pertains to. A value of the presence element is sent to a corresponding watcher according to a correlation between the class corresponding to the value in the presence information and the class derived from the right rule obtained from the authentication configuration information.

10 Claims, 3 Drawing Sheets

Related U.S. Application Data continuation of application No. PCT/CN2007/000438, filed on Feb. 8, 2007.

(51) Int. Cl.
*H04L 29/08* (2006.01)
*H04L 12/58* (2006.01)

(58) Field of Classification Search
USPC .................................................. 709/206–207
See application file for complete search history.

(56) References Cited

U.S. PATENT DOCUMENTS

| | | |
|---|---|---|
| 2003/0065788 A1 | 4/2003 | Salomaki |
| 2005/0135240 A1 | 6/2005 | Ozugur |
| 2005/0253874 A1 | 11/2005 | Lal et al. |
| 2005/0270157 A1 | 12/2005 | Mohammed et al. |
| 2006/0053208 A1* | 3/2006 | Laurila .................. H04W 4/08 709/206 |
| 2006/0190600 A1 | 8/2006 | Blohm et al. |
| 2006/0248184 A1* | 11/2006 | Wu ........................ H04L 67/14 709/224 |
| 2008/0316939 A1 | 12/2008 | Shimamura et al. |

FOREIGN PATENT DOCUMENTS

| | | |
|---|---|---|
| CN | 1710889 | 12/2005 |
| EP | 1396988 | 3/2004 |
| EP | 1589717 | 10/2005 |
| EP | 1699218 A1 | 9/2006 |
| JP | 2005-4567 A | 1/2005 |
| JP | 2005-63019 A | 3/2005 |
| KR | 1020040005882 A | 1/2004 |
| KR | 1020040095042 A | 11/2004 |
| KR | 1020050055687 A | 6/2005 |
| KR | 10-2005-0096835 A | 10/2005 |
| WO | 2005067274 A1 | 7/2005 |
| WO | 2006027407 A1 | 3/2006 |

OTHER PUBLICATIONS

The 1st Office Action regarding Chinese priority application 00610080044.5.
European Search Report dated Apr. 24, 2008 Application No./U.S. Pat. No. 07702310.9-2416 PCT/CN2007000438.
H. Schulzrinne et al; "RPID: Rich Presence Extensions to the Prescence Information Data Format (PIDF); draft-ietf-simple-rpid-10.txt", IETF Standar Working-Draft, Internet Engineering Task Force, IETF, CH, vol. Simple, No. 20 Dec. 2005 XP015044136; ISSN: 0000-0004 whole document.
Japanese Notice of Reasons for Rejection, Application No. 2008-540438, dated Sep. 13, 2011, 8 pages.
Open Mobile Alliance; "Open Mobile Alliance OMA-TS-Presence_SIMPLE-V1_0-20060214-C", Presence SIMPLE Specification, Candidate Version 1.0—Feb. 14, 2006;© 0pen Mobile Alliance Ltd.
The English Translation of the Written Opinion of the International Search Authority.

* cited by examiner

METHOD AND SYSTEM FOR REALIZING PRESENCE SERVICE, PRESENCE INFORMATION PROCESSING DEVICE AND PRESENTITY CLIENT

This application is a continuation of U.S. patent application Ser. No. 11/944,712, filed on Nov. 26, 2007, which is a continuation of International Application No. PCT/CN2007/000438, filed on Feb. 8, 2007, which claims priority to Chinese Patent Application No. 200610034669.8 filed on Mar. 24, 2006 and to Chinese Patent Application No. 200610080044.5 filed on May 1, 2006. The afore-mentioned patent applications are hereby incorporated by reference in their entireties.

TECHNICAL FIELD

The present invention relates to the realization of presence service in the fields of Internet and wireless communications, in particular, to a method and a system for realizing presence service, a device of processing presence information and a presentity client.

BACKGROUND

A presence service is also referred to an existence service, which is a communication service for collecting and distributing presence information. At present, the presence service is usually provided together with an instant message service. Of course, the presence service may also be provided independently, or in conjunction with other services, such as network game services. Further, standard specifications related to presence services have been worked out preliminarily by international standard organizations such as OMA (Open Mobile Alliance), and are now being perfected continually.

The presence service mainly relates to three components: a presentity, presence information and a watcher. The presentity may be a natural person, or a non-natural person. In addition to basic information of a presentity such as online/offline state and communication mode, the presence information may also include extended information such as mood, location, activity, and value-added service information provided by the non-natural person, such as information of weather forecast, station or television program and traffic movement. The watcher, i.e., a receiver of the presence information, may be the natural person or the non-natural person.

In a data model of the presence information provided by IETF (Internet Engineering Task Force), the presence information is divided into three parts as shown in FIG. 1, including: Person, Service and Device. The specific elements corresponding to the above three parts in a presence information document are as follows: <person> element, <tuple> element and <device> element. Each of the three elements includes a great number of sub-elements. For example, <person> element may include sub-elements such as <activities>, <mood>, <status-icon> and <time-offset>. For detail, reference may be made to corresponding standard specifications of IETF or OMA.

A method for realizing a presence service in the prior art mainly includes the following issuing presence information by a presentity, receiving and storing the presence information by a presence server, and determining, by the presence server, the presence information that is allowed to be obtained by the watcher according to an authentication configuration information, distributing, by the presence server, the presence information to a corresponding watcher, and presenting received presence information by the watcher.

SUMMARY OF THE INVENTION

One embodiment of the present invention provides a method for realizing presence service, and watchers of the presence information are grouped and a grouping result is recorded, and in the presence information, different values are set for same presence element and a correlation between the different values of the presence element and corresponding watcher groups is configured. The method includes receiving the presence information, and determining which group the watcher allowed to obtain the presence information pertains to according to the grouping result, and sending a value corresponding to the presence element in the presence information to corresponding watcher according to the correlation between the different values of the presence element and corresponding watcher groups.

One embodiment of the present invention further provides a system for realizing presence service, including a presentity client and a presence information processing device, and, the presentity client is adapted to group the watchers of the presence information and transfer the grouping result to a presence information processing device, in the presence information, set different values for same presence element and configure a correlation between the different values of the presence element and corresponding watcher groups, and send the presence information to the presence information processing device, and the presence information processing device is adapted to record a grouping result sent by the presentity client, and determine which group the watcher allowed to obtain the presence information pertains to according to the grouping result after the presence information is received, and send the value corresponding to a presence element in the presence information to corresponding watcher according to the correlation between the different values of the presence element and corresponding watcher groups.

The invention further provides a presence information processing device, including: a grouping result recording unit, adapted to record a watcher grouping result sent by a presentity client, and the grouping unit is adapted to determine which group the watcher allowed to obtain the presence information pertains to according to the grouping result recorded in the grouping result recording unit after the presence information is received, and the presence information sending unit is adapted to send the value corresponding to a presence element in the presence information to the corresponding watcher according to the correlation between the different values of the presence element and corresponding watcher groups.

One embodiment of the present invention further discloses a presentity client, including: a watcher grouping unit, a presence information configuring unit and a presence information sending unit, and the watcher grouping unit is adapted to group the watchers of the presence information and transfer the grouping result to a presence information processing device and a presence information configuring unit, the presence information configuring unit is adapted to, in the presence information, set different values for same presence element and configure a correlation between the different values of the presence element and corresponding watcher groups according to the grouping result of the watcher grouping unit, and the presence information sending unit is adapted to transfer the presence information processed by the presence information configuring unit to the presence information processing device.

The embodiments of the present invention may attain the following beneficial effects.

In one embodiment of the present invention, by recording a correlation between a watcher identity and a class in the authentication configuration information of a presentity for a watcher and making the presence information related to the corresponding class in the presence information issued by the presentity, the presence server determines the presence information that may be obtained by the watcher according to the correlation between the class and the watcher identity and presence information, so that the same presence information element of the same presentity may present different values to different watchers at the same time. By employing the solution according to the embodiments of the present invention, the provision mode of the presence information may be more flexible, and the service capacity of presence service may be improved.

BRIEF DESCRIPTION OF THE DRAWINGS

The embodiments of the present invention will now be further illustrated in conjunction with the drawings, and.

DETAILED DESCRIPTION OF ILLUSTRATIVE EMBODIMENTS

At present, a presence service for a commercial use is basically integrated with an instant message service, such as QQ of Tencent Holdings or MSN of Microsoft Corporation. But in the presence services for the commercial use, a same presence information element of a user is not allowed to present different values to different watchers. For example, for <mood> element, a user wants to present "happy" information to contacts (also referred to as intimates) belonging to group "Friend", but to present "lonely" information to other contacts at the same time. Additionally, for user state information such as offline and online, a user also wants to display different state information to different contacts, so that unwanted disturb may be reduced. Thus, the same presence information element may present different values to different watchers at the same time.

However, in an existing presence service, no mechanism exists for presenting different values to different watchers for the same presence information element at the same time. Therefore, the present processing method needs to be improved, so that the same presence information element of the same presentity may present different values to different watchers at the same time in the presence service.

To solve the above problem, embodiments of the present invention provide a method, a system, a device of processing presence information and a presentity client for realizing a presence service. Specific embodiments of the present invention will now be described in conjunction with the drawings.

Figure 1:
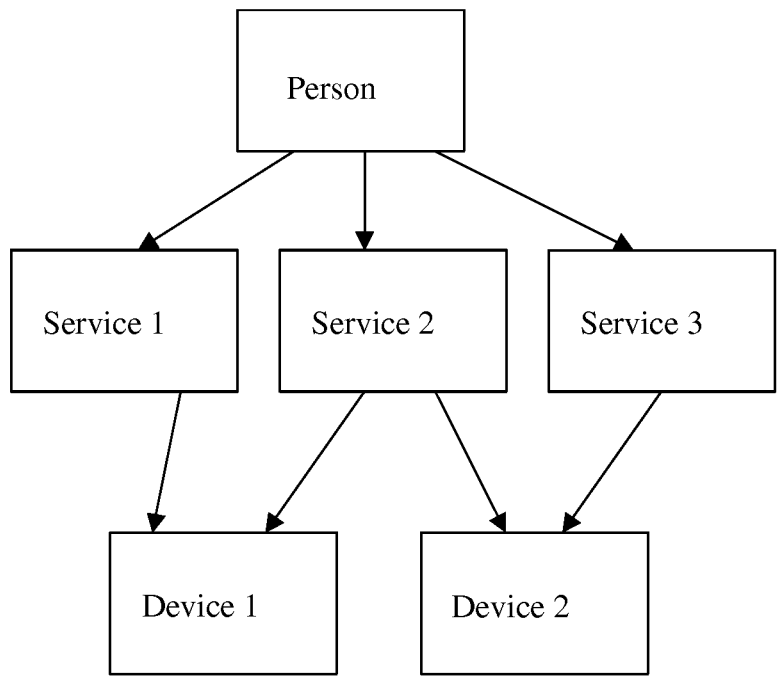
FIG. 1 is a diagram showing a data model of presence information.
Figure 2:
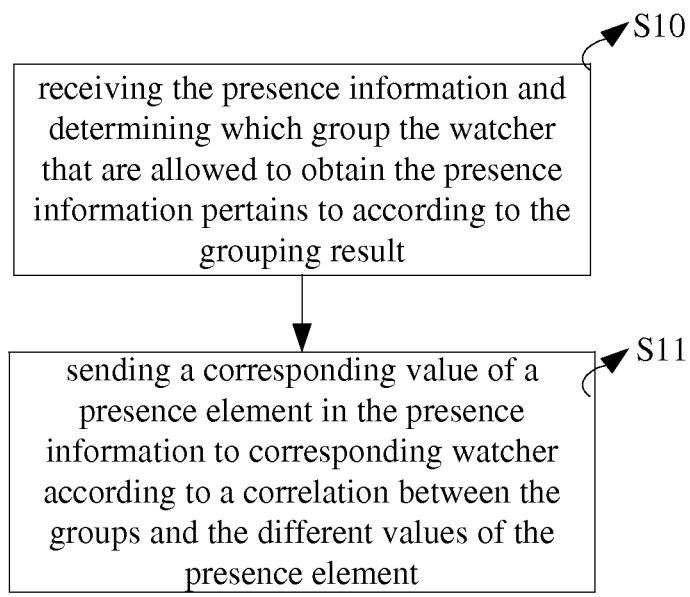
FIG. 2 is a basic flow chart of a method for realizing presence service according to one embodiment of the present invention.

In one embodiment of the present invention, watchers of presence information need to be grouped and a grouping result needs to be recorded; and in the presence information sent by a presentity, different values are set for one presence element, and a correlation between the different values of the presence element and the corresponding watcher groups is configured. FIG. 2 is a flow chart of a method for realizing presence service according to one embodiment of the present invention, including the following steps.

S10: Receiving presence information and determining which group a watcher allowed to obtain the presence information pertains to according to a grouping result; and S11: Sending a corresponding value of a presence element in the presence information to a corresponding watcher according to a correlation between the watcher groups and the different values of the presence element.

In one embodiment of the present invention, different classes may be employed to represent different grouping results. Other identities may also be employed to represent different grouping results. This will not influence the implementation of the embodiments of the present invention.

When different classes are employed to represent different grouping results, recording the grouping result includes recording a correlation between the watcher identity and the class of the group which the watcher pertains to.

Configuring the correlation between the different values of the presence element and the corresponding watcher groups includes configuring corresponding classes for the presence element with different values.

The correlation between the watcher identity and the class of the group which the watcher pertains to is usually recorded with a right rule in an authentication configuration information. In other embodiments of the present invention, other methods may also be employed for recording. This will not influence the implementation of the embodiments of the present invention.

Authentication configuration information of a presentity is usually stored in a presence service XDM (XML Document Management) server in XML (Extensible Markup Language) format logically. Or, the authentication configuration information of the presentity may be stored in the presence server using a relational database directly. The specific content of the authentication configuration information is an information set including at least one rule. Each rule further includes <conditions> element, <actions> element and <transformations> element. <conditions> element designates an identity of a watcher, for example, a URI (Uniform Resource Identifier) of a watcher (such as SIP URI, phone number and Email address), or an identity of a domain which the watcher pertains to. The type of the allowed processing is configured in <actions> element and the class is configured in <transformations> element.

One specific example of the authentication configuration information of a presentity is as follows:

```
<ruleset entity="someone@example.com"><rule id="1">
<conditions><identity>
<id entity="user@example.com"/>
</identity></conditions>
<actions><sub-handling>allow</sub-handling></actions>
```

-continued

```
<transformations>
<provide-persons><class>friends</class></provide-persons>
</transformations>
</rule></ruleset>
```

The above authentication configuration information includes a rule. Before the presence server distributes the presence information of the presentity, the presence server resolves a content of the rule and determines that a watcher with the identity of "user@example.com" is allowed to obtain <person> element with a class of "friends". The identity of a watcher and the corresponding class may be correlated via the above <conditions> element and <transformations> element.

In one embodiment of the present invention, if the correlation between the watcher identity and the class of the watcher group which the watcher pertains to is recorded using a right rule in the authentication configuration information, configuring classes for the presence element with different values may include: configuring class sub-elements for the presence element respectively, and recording corresponding classes in the class sub-element of the corresponding presence element respectively. In other embodiments of the present invention, other methods may also be adopted. This will not influence the implementation of the present invention.

The presentity client issues presence information via a message SIP PUBLISH. A text of the message body includes a content of a presence information document. During issuing the presence information, class is taken as a sub-element of a certain presence information element. Particularly, the class may be taken as a sub-element of <person> element, <tuple> element or <device> element. Thus, the presence information and the corresponding class are correlated before the presence information is issued, i.e. corresponding to grouping the presence information with classes. However, <class> sub-element may not be necessary for such three elements.

The presentity client issues the presence information grouped with the class. An example of the presence information document correlated to the class is as follows:

```
<presence entity="someone@example.com">
<person id="1">
<mood><happy/></mood>
<status-icon>http://example.com/friends.gif</status-icon>
<class>friends</class>
</person>
</presence>
```

A <class>friends</class> sub-element is configured in <person> element in the presence information document issued by the above presentity "someone@example.com".

After the presence server receives and stores the presence information document and before sending the presence information to the watcher, the presence server firstly obtains the authentication configuration information of the presentity according to the presentity information carried in the presence information, and determines classes corresponding to different watchers by resolving the authentication information and obtaining a right rule, and then sends the value of a presence element with the corresponding class in the class sub-element to a watcher corresponding to the class.

By adopting the above method, different values of the same presence element may be sent to different watchers. For instance, in the above presence information document, it is further assumed that <person> element with a corresponding class of "enemies" is also included:

```
<person id="2">
<mood><angry/></mood>
<status-icon>http://example.com/enemies.gif</status-icon>
<class>enemies</class>
</person>
```

Correspondingly, the above authentication configuration information includes <rule> element with a corresponding class of "enemies":

```
<rule id="2">
<conditions><identity>
<id entity="badboy@example.com"/>
</identity></conditions>
<actions><sub-handling>allow</sub-handling></actions>
<transformations>
<provide-persons><class>enemies</class></provide-persons>
</transformations>
</rule>
```

When the presence server distributes the presence information to a watcher according to the authentication configuration information and the presence information document, for the same presence information element such as <mood>, watcher "badboy@example.com" will obtain a value "angry", while watcher "user@example.com" will obtain a value "happy"; in other words, the same element may present different values to different watchers. Thus, the presence capacity of the service will be improved greatly.

The presentity client may also create, modify, delete or obtain authentication configuration information in an XDM server via XCAP (XML Configuration Access Protocol). The presence server may also obtain the authentication configuration information in the XDM server via XCAP protocol so as to authenticate the request of a watcher for obtaining the presence information and determine which presence information of the presentity will be sent to which watcher and so on. Once the presence server obtains the authentication configuration information, the presence server may buffer the authentication configuration information locally for improving the processing efficiency; and may subscribe for a change event of the authentication configuration information. When a subscribed XML document in the XDM server changes, the XDM server will send the changed information to the presence server via SIP or the presence server will obtain a latest XML document via XCAP according to a change notification message from the XDM server.

In practice, a presentity usually corresponds to a plurality of presence information resources, such as a mobile phone of a user, a computer of a user, and a physical entity in the communication network of an operator (for example, HLR (Home Location Register) and Application Server). These presence information resources may issue the presence information of the presentity. Therefore, the method according to one embodiment of the present invention further includes: performing, by the presence server, a corresponding edit and synthesis on the presence information from different presence information resources, and forming an original presence information document in the presence server for a presentity.

Because the <class> element influences the content of presence information to be obtained by a watcher finally, the processing on <class> element should be considered during the edit and synthesis, rather than simply performing a merging process. A problem may rise when the following two <person> elements are merged, and it is assumed that <person> element of the presentity has already been in the presence server:

```
<person id="11">
<overriding-willingness>
<basic>close</basic>
</overriding-willingness>
<mood>happy</mood>
</person>
```

The above <person> element does not include <class> element. If the <person> element is merged with another newly received <person> element including <class> element, for example, the above <person> element is merged with the following <person> element:

```
<person id="22">
<overriding-willingness>
<basic>close</basic>
</overriding-willingness>
<class>enemies</class>
</person>
```

During the merging process, the instance identity of <person> element is neglected at first, and only one copy of the same element is kept. In this example, <overriding-willingness> elements are the same. If data is kept in the presence server and the presence server has no <class> element, the element will be added. The merging result is:

```
<person id="33">
<overriding-willingness>
<basic>close</basic>
</overriding-willingness>
<mood>happy</mood>
<class>enemies</class>
</person>
```

Thus, only one <person> element with a corresponding class of "enemies" exists in the presence server. As a result, a watcher whose corresponding class is not "enemies" will no longer be able to obtain <person> element.

To overcome the defect of the above merging method, it further needs to check whether the class information is totally the same when the presence information element is merged, so that unreasonable merging result may be avoided.

The corresponding edit and synthesis of the presence information from different presence information resources according to one embodiment of the present invention includes: determining whether the class sub-elements contained in the presence information issued by different presence information resources has the same value or no class sub-element is contained in the presence information issued by different presence information resources, if it is determined that the class sub-elements contained in the presence information issued by different presence information resources have the same value or no class sub-element is contained in the presence information issued by different presence information resources, the presence information issued by the different presence sources is merged.

Figure 3:
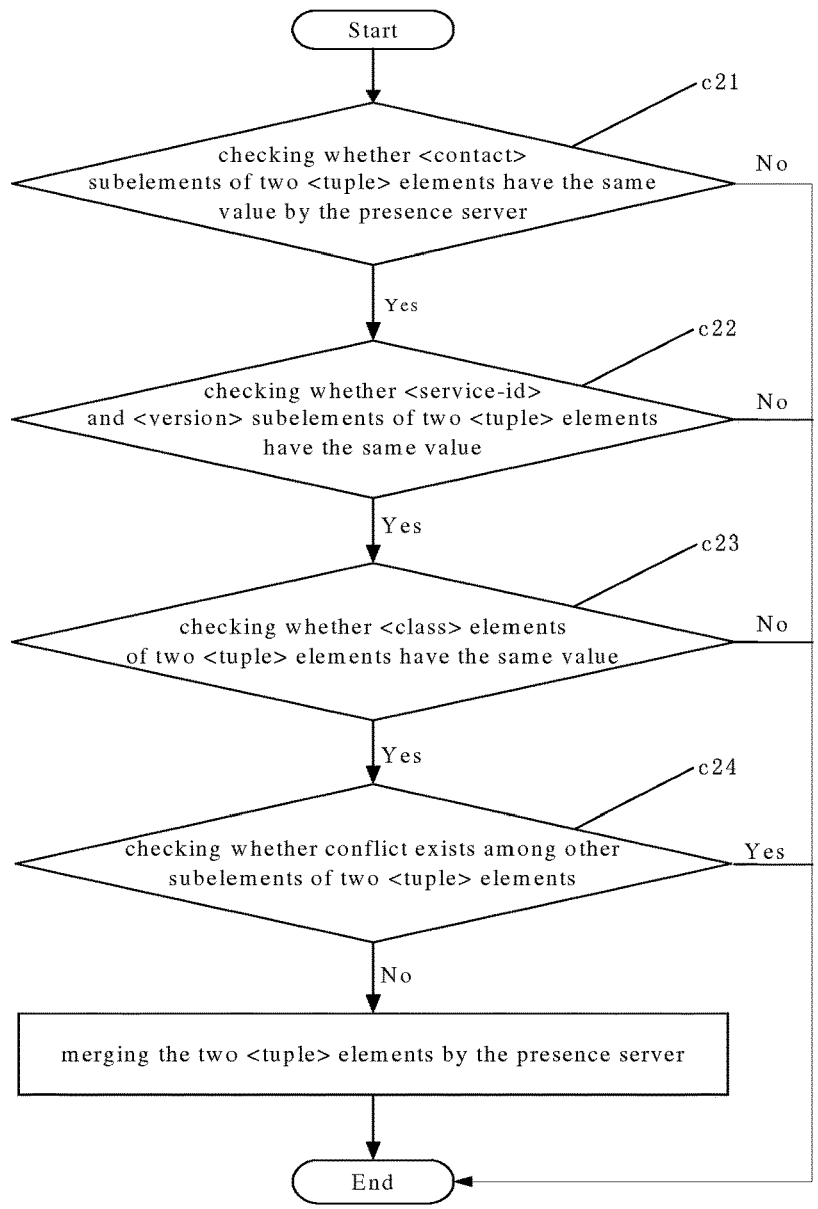
FIG. 3 is a flow chart of a process for merging presence information according to one embodiment of the present invention.

The presence server may check the merging condition and perform a merging process on <person> element, <tuple> element and <device> element respectively. The elements form an original presence information document. Taking the merging of two elements <tuple> as an example, the specific edit and synthesis process of <class> element is shown in FIG. 3 and includes the follows.

c21: The presence server checks whether <contact> sub-element of <tuple> element in different presence information has the same value, if yes, the process turns to c22; otherwise, the different presence information is not merged and the process terminates.

c22: The presence server checks whether <service-id> and <version> sub-elements of <service-description> element of <tuple> element in different presence information have the same value, if yes, the process turns to c23; otherwise, the different presence information is not merged and the process terminates.

c23: The presence server checks whether <class> element of <tuple> element in different presence information has the same value, if yes, the process turns to c24, otherwise, the different presence information is not merged and the process terminates. If one <tuple> element has <class> element while the other has not, the different presence information is not merged and if neither of the two elements <tuple> has <class> element, the presence server determines that it belongs to the case in which <class> elements have the same value, and the process turns to c24.

c24: The presence server checks whether a conflict exists among other sub-elements of <tuple> element in different presence information, i.e., whether the same element has different values. if no conflict exists, a merging process is performed; otherwise, the different presence information is not merged, and the process terminates.

According to the above process, if one of the two elements <tuple> has <class> element and the other does not have <class> element, the presence server will not perform the merging process.

When the presence information document is distributed to a watcher client, the corresponding merging process may be performed before the presence information document is finally present to the client; otherwise, the watcher may obtain unclear or even conflicting presence information. Because the presence server usually does not send <class> element to a watcher, the watcher client performs a merging process on <person> element, <tuple> element or <device> element that do not have <class> element. If no conflict exists, a simple and direct merging process is enough; if conflict exists (in other words, one element has different values), the value of the latest <timestamp> element is used as a standard value.

Additionally, in c22, <service-description> element further has <description> element, which is a segment of simple descriptive words on the service corresponding to <tuple>. It is possible that the values of the element issued by different presence information resources have some descriptive difference, such as difference between capital letter and lowercase letter, difference between punctuations. Therefore, when <description> elements are different, the merging of <tuple> elements should not be forbidden. In other words, during the above checking process of the merging in the presence server, <description> element may be neglected. In c24, when <tuple> element newly issued to the presence server is merged, if <tuple> element that exists in the presence server has a value of <description> element, the value will not be changed; otherwise, the value of <description> element in <tuple> element newly issued to the presence server is added.

The way for determining the conflict mentioned in c24 is to determine whether the same element has different values. In fact, it is also conflicting when the values of XML elements in some presence information are the same but the attributes are different. Therefore, in c24, when the values are the same, the presence server further needs to determine whether the attributes are the same; if the attributes are different, it is also regarded as a conflict, and no merging is performed.

In a presence service system, each of <person> element, <tuple> element and <device> element usually has no <class> element or one <class> element, but some systems may support a plurality of <class> elements, which enables the system to provide stronger functions. For example, if <person> element has two <class> elements, such as <class>friends</class> and <class>colleagues</class>, the presence server may provide the information of <person> element to watchers corresponding to the two classes. Therefore, the control on the presence information becomes more flexible. However, in that case, trouble will arise when <person> element and the like are merged. For example, when two <person> elements are merged, the presence server checks that two <person> elements has the same class such as <class>friends</class> while one of the two <person> elements further includes another class such as <class>colleagues</class>, the specific content of which is as follows:

```
<person id="111">
<mood>happy</mood>
<class>friends</class>
</person>
```

The other <person> element:

```
<person id="222">
<activities><breakfast/></activities>
<class>friends</class>
<class>colleagues</class>
</person>
```

After the above two elements are merged, it obtains:

```
<person id="333">
<mood>happy</mood>
<activities><breakfast/></activities>
<class>friends</class>
<class>colleagues</class>
</person>
```

It may be found that a watcher corresponding to the class of <class>colleagues</class> may obtain information <mood>happy</mood> not allowed to be obtained, thus such a merging process is improper. Therefore, taking <person> element as an example, the reasonable edit and synthesis process of the presence server includes the following.

c11: The presence server checks whether <class> element of <person> element in different presence information has the same value, if yes, the process turns to c12, otherwise, the different presence information is not merged and the process terminates. The presence server determines that two <person> elements have the same value of <class> when the presence server finds that <class> element in any one of the two <person> elements have the same value in the other <person> element. However, if neither of the two elements <person> has <class> element, it may also be determined that the two <person> elements have the same value of <class>.

c12: The presence server checks whether a conflict exists among other sub-elements in <person> element of different presence information, i.e., whether the same element has different values. If no conflict exists, the different presence information is merged; otherwise, the different presence information is not merged and the process ends.

Similarly, in addition to the above <tuple> element and <person> element, other presence information elements that include <class> element, after the presence server receives the presence information issued by different presence information resources for the same presentity, may be merged when the presence server finds that the <class> element contained therein has the same value or no <class> element is included; otherwise, may not be merged. Of course, other conditions may also be checked before the merging process, and passing the checking for the class is merely a necessary condition for merging.

Because the value of <class> element usually is an intelligible vocabulary configured by a presentity user, such as "friends", the value in fact indicates the classification inclination of a presentity user for watcher users. However, the presentity user usually does not want the watcher user to obtain the information, which essentially also belongs to privacy information of the user. When it is considered that class information is also a kind of privacy information of the presentity and is only useful for the presentity and the presence server, and thus does not need to be sent to a watcher, the presence server needs to delete <class> element contained in elements such as <person>, <tuple>, and then sends the content of the presence information that does not include <class> element to the watcher, after the presence server determines the content of the presence information to be sent to a watcher according to the authentication configuration information. As a result, the privacy of the presentity user is protected.

Sending <class> element to a watcher may also be forbidden by configuring the authentication configuration information. A <provide-class> sub-element is used in <transformations> element as a control flag for determining whether to send <class> element. The value of <provide-class> sub-element is of Boolean logic type. When it is TRUE, the presence server provides <class> element; when it is FALSE, no <class> element is provided.

Additionally, the presence server also influences the right merging mode of a rule set if the right merging principle of the presence server is a union set operation, i.e., a logic OR operation is performed on the right in the rule. For example, if the value of <provide-class> sub-element is set as TRUE in the rule data for a watcher, while the value of <provide-class> sub-element is set as FALSE in another rule data for the same watcher, the final result of the merging rule set operation performed by the presence server according to the principle of union set operation is that the value of <provide-class> sub-element is TRUE. One specific example is as follows:

```
<rule id="3">
<conditions><identity>
<id entity="badboy@example.com"/>
</identity></conditions>
<actions><sub-handling>allow</sub-handling></actions>
<transformations>
```

-continued

```
<provide-persons><class>enemies</class></provide-persons>
<provide-class>FALSE</provide-class>
</transformations>
</rule>
```

In the above example, after the presence server resolves the rule data, the presence server does not send the class information, i.e., <class>enemies</class>, to watcher "badboy@example.com" according to the <provide-class>FALSE</provide-class>. A <identity> element may include the identities of a plurality of watchers, and may also cite the URI of a resource list. Usually, the resource list is a group defined by a user, includes the URIs of some specific members and is usually stored in a Shared List XDM server. If the URI of a resource list is cited in the rule, the presence server may obtain the URI data of specific members in the URI of the resource list from the Shared List XDM server via XCAP protocol according to the cited URI of the resource list.

If the right merging principle of the presence server is an intersection operation, a logic "AND" operation is performed on the right in the rule. For example, for the same watcher, if the value of <provide-class> sub-element is set as TRUE in the rule data while the value of <provide-class> sub-element is set as FALSE in another rule data, the final result of the merging rule set operation performed by the presence server according to the principle of the intersection operation is that the value of <provide-class> sub-element is FALSE. In this way, it is easier to forbid providing class information to all the watchers (or most of the watcher). Specifically, it is configured in a rule that all the watchers are unable to obtain the class information, and the content of the rule is as follows:

```
<rule id="4">
<conditions><identity><any-identity/></identity></conditions>
<actions><sub-handling>allow</sub-handling></actions>
<transformations>
<provide-class>FALSE</provide-class>
</transformations>
</rule>
```

<any-identity/> represents all the watchers. The presence server forbids providing class information to all the watchers even if it is not forbidden or directly allowed to provide class information in other rules, according to the <provide-class>FALSE</provide-class> configured in the rule, i.e., it is forbidden to provide class information, and according to the principle of intersection operation.

The presence server also performs a filtering process, in addition to an authentication process according to the class in the received presence information. A presence information subscription message sent by a watcher includes the filtering information for the class. When the presence server distributes the presence information to the watcher, the presence server only sends the presence information that satisfies the filtering information for the class to the watcher. An example of the filtering information in the subscription message is as follows:

```
<filter-set><filter id="1" uri="someone@example.com">
<what><include>class="PoC"</include></what>
</filter></filter-set>
```

In other words, it is designated that only an element with class="PoC" can be sent to the watcher in the filtering information with an identity of 1 defined in <filter-set>.

Figure 4:
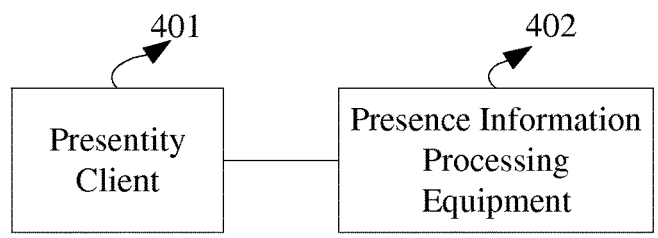
FIG. 4 is a structural representation of a system for realizing presence service according to one embodiment of the present invention.

One embodiment of the present invention further provides a presence service system, as shown in FIG. 4, including: a presentity client 401 and a presence information processing device 402, and the presentity client is adapted to group watchers of presence information and transfer a grouping result to a presence information processing device, set different values for one presence element in the presence information and configure a correlation between the different values of the presence element and the corresponding watcher groups, and send the presence information to the presence information processing device, the presence information processing device is adapted to record the grouping result sent by the presentity client and determine which group the watcher allowed to obtain the presence information pertains to according to the grouping result after the presence information is received, and send the value corresponding to the presence element in the presence information to the corresponding watcher according to the correlation between the groups and the different values of the presence element.

In an embodiment of the present invention, different classes are employed to represent different grouping results. In other embodiments of the present invention, other identities may also be employed to represent different grouping results. This will not influence the implementation of the embodiments of the present invention.

If different classes are employed to represent different grouping results, the presentity client implements the grouping function by grouping the watchers with classes, and configures the corresponding class respectively for the presence element with different values to implement the function of configuring a correlation between the different values of the presence element and the corresponding watcher groups.

The presence information processing device records the correlation between the watcher identity and the class of the group which the watcher pertains to implement a function of recording a grouping result by recording the correlation between the watcher identity and the class of the group which the watcher pertains to.

The presence information processing device records the correlation by adopting a right rule record in the authentication configuration information.

In one embodiment of the present invention, if the presence processing device records the correlation between the watcher identity and the class of the group which the watcher pertains to by employing a right rule recorded in the authentication configuration information, the presentity client implements a function of configuring classes for the presence element with different values by recording the corresponding class in the class sub-element of the corresponding presence element respectively.

In practice, because a presentity often corresponds to a plurality of presence information resources, such as a mobile phone of a user, a computer of a user, and a physical entity in the communication network of an operator (such as HLR, Application Server). These presence information resources may issue the presence information of the presentity. If the presence information processing device receives the presence information issued for the same presentity by at least two different presence sources, before sending the presence information to the watcher, the presence information processing device is further adapted to determine whether the class sub-element contained in the presence information issued by different presence sources has the same value or no class sub-element is contained, if it is determined that the class sub-element contained in the presence information issued by different presence sources has the same value or no class sub-element is contained, the presence information issued by the different presence sources is merged.

When it is considered that class information is also a kind of privacy information of the presentity and is only useful for the presentity and the presence server, and does not need to be sent to a watcher, to protect the privacy of the presentity, the presence information processing device is further adapted to configure a flag which indicates whether to provide a class in the right rule of the authentication configuration information.

Before sending the presence information to the watcher, the presence information processing device is further adapted to delete or keep the class information contained in the presence information document according to the flag configured in the right rule, which indicating whether to provide a class.

In practice, the number of right rules for a watcher is at least two. To avoid obtaining unclear and even conflicting presence information by a watcher, the rules should be merged correspondingly. Therefore, the presence information processing device is further adapted to perform a logic OR or logic AND operation on the at least two right rules and take the result as the right rule of the watcher.

Additionally, the presence processing device may also perform a filtering process in addition to the authentication process according to the class in the received presence information. Therefore, the presence information processing device is further adapted to receive the subscription information sent by a watcher, and the subscription information further includes filtering information for the class, and determine a presence element satisfying the filtering requirement according to the filtering information for the class before sending the corresponding value of the presence element to the corresponding watcher, and then send the presence element that meets the filtering requirement.

In one embodiment of the system according to the present invention, the presence information processing device may be a presence server, and may include a presence server and an XDM server. The XDM server is adapted to record the authentication configuration information sent by a presentity client, and the information includes the grouping result. The presence server obtains the authentication configuration information from the XDM server, and obtains the group which a watcher pertains to, and sends the value corresponding to a presence element in the presence information to the corresponding watcher.

The presence server is further adapted to subscribe for a change event of the authentication configuration information the XDM server is further adapted to send the changed authentication configuration information to the presence server via SIP when the subscribed authentication configuration information on the XDM server changes, or the presence server is further adapted to obtain the latest authentication configuration information via XCAP protocol according to a change notification message from the XDM server when the subscribed authentication configuration information on the XDM server changes.

Figure 5:
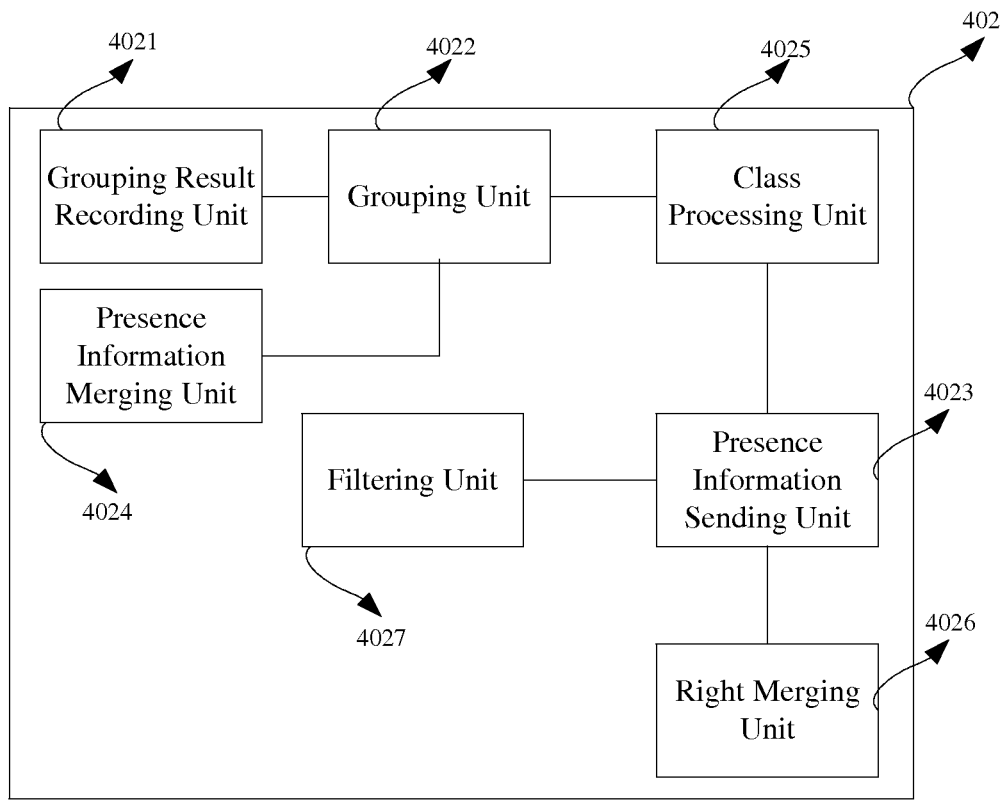
FIG. 5 is a structural representation of a presence information processing device according to one embodiment of the present invention.

One embodiment of the present invention further provides a presence information processing device, as shown in FIG. 5, including a grouping result recording unit 4021, adapted to record a grouping result sent by the presentity client, a grouping unit 4022, adapted to determine which group the watcher allowed to obtain the presence information pertains to according to the grouping result recorded in the grouping result recording unit after the presence information is received, and a presence information sending unit 4023, adapted to send the value corresponding to a presence element in the presence information to the corresponding watcher according to the correlation between the groups and the different values of presence element.

In one embodiment of the present invention, different classes are employed to represent different grouping results. Therefore, the grouping result recording unit implements a function of recording a grouping result by recording the correlation between the watcher identity and the class of the group which the watcher pertains to.

The grouping result recording unit may record the correlation using a right rule in the authentication configuration information, or may record the correlation using other rules. This will not influence the implementation of the embodiments of the present invention.

In practice, a presentity often corresponds to a plurality of presence information resources, such as a mobile phone of a user, a computer of a user, and a physical entity in the communication network of an operator (such as HLR, Application Server). These presence information resources may issue the presence information of the presentity. If the presence information processing device receives a presence information issued for one presentity by at least two different presence sources, the presence information processing device further includes a presence information merging unit 4024, adapted to determine whether the class sub-elements contained in the presence information issued by the different presence sources have the same value or no class sub-element is contained, if the class sub-elements contained in the presence information issued by the different presence sources have the same value or no class sub-element is contained, the presence information issued by the different presence sources is merged.

When it is considered that class information is also a kind of privacy information of the presentity and is only useful for the presentity and the presence server, and does not need to be sent to a watcher, to protect the privacy of the presentity, the presence information processing device further includes a class processing unit 4025, which is adapted to configure a flag indicating whether to provide a class in the right rule of the authentication configuration information, and delete or keep the class information contained in the presence information document according to the flag indicating whether to provide a class configured in the right rule, before sending the presence information to the watcher.

In practice, the number of right rules for a watcher is at least two. To avoid obtaining unclear and even conflicting presence information by a watcher, the rules may be merged correspondingly, and the presence information processing device further includes a right merging unit 4026, which is adapted to perform a logic OR or logic AND operation on the at least two right rules, and take the result as the right rule of the watcher.

Additionally, the presence processing device may also perform a filtering process in addition to the authentication process according to the class in the received presence information. Therefore, the presence information processing device further includes a filtering unit 4027, which is adapted to receive the subscription information sent by a watcher, and the subscription information further includes filtering information for the class; determine a presence element satisfying the filtering requirement according to the filtering information for the class before sending the corresponding value of the presence element to the corresponding watcher, and then notify the presence information sending unit to send the presence element satisfying the filtering requirement.

In one embodiment of the present invention, the presence information processing device is a presence server, and the grouping result recording unit is built in the presence server. In other embodiments of the present invention, the grouping result recording unit is an XDM server, and the grouping unit and the presence information sending unit are implemented as a presence server.

Figure 6:
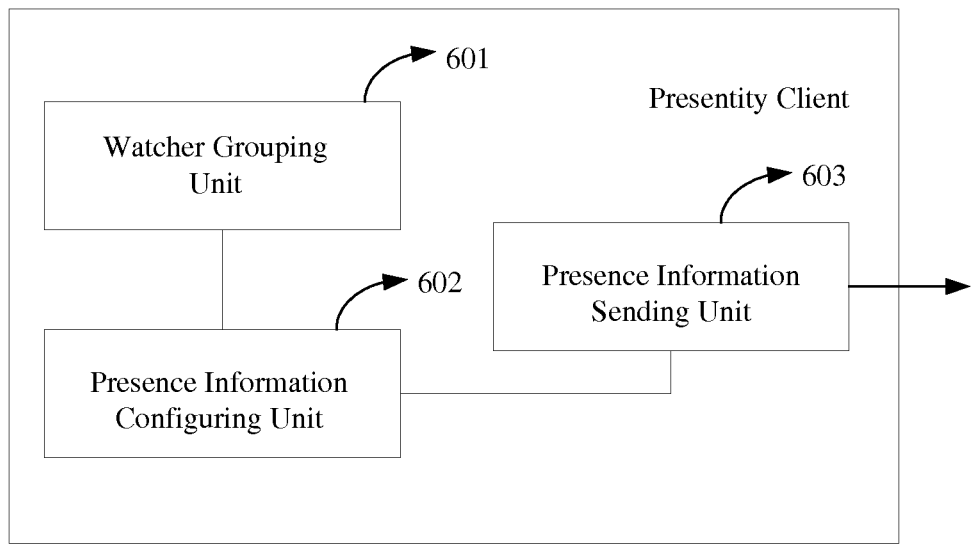
FIG. 6 is a structural representation of a presentity client according to one embodiment of the present invention.

One embodiment of the present invention further provides a presentity client, as shown in FIG. 6, including: a watcher grouping unit 601, a presence information configuring unit 602 and a presence information sending unit 603, in which the watcher grouping unit 601 is adapted to group the watchers of the presence information and transfer the grouping result to the presence information processing device and the presence information configuring unit 602, the presence information configuring unit 602 is adapted to set different values for one presence element in the presence information, and configure a correlation between the different values of the presence element and the corresponding watcher groups according to the grouping result of the watcher grouping unit, and the presence information sending unit 603 is adapted to transfer the presence information processed by the presence information configuring unit to the presence information processing device.

The watcher grouping unit 601 may group the watchers via class to implement the grouping function.

Correspondingly, the presence information configuring unit 602 may configure the corresponding class respectively for the presence element with different values to implement the function of configuring a correlation between the different values of the presence element and the corresponding watcher groups.

In one preferred embodiment of the present invention, the presence information configuring unit 602 may also record the corresponding class in the class sub-element of the corresponding presence element respectively to implement the function of configuring the corresponding class respectively for the presence element with different values.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A method for processing presence information, the method comprising:
   receiving presence information issued for one presentity by at least two different presence sources, with the presence information comprising presentity information, different values of a presence element, and classes corresponding to the values, wherein the classes are used to distinguish between different values of the presence element sent to different watchers;
   obtaining authentication configuration information of a presentity according to the presentity information;
   obtaining a right rule by resolving the authentication configuration information, the right rule comprising a correlation configured by the presentity between a watcher identity and a class of a group that the watcher identity pertains to, the watcher identity configured in a condition element of the right rule; the class of the group that the watcher identity pertains to is configured in a transformation element of the right rule; and a class sub-element is configured in the presence element to record a class corresponding to a value of the presence element;
   determining whether class sub-elements contained in the presence information issued by the different presence sources have the same value or no class sub-element is contained;
   merging the presence information issued by the different presence sources if the class sub-elements contained in the presence information issued by the different presence sources have the same value or no class sub-element is contained; and
   sending a value of the presence element to a corresponding watcher according to a correlation between the class corresponding to the value in the presence information and the class derived from the right rule obtained from the authentication configuration information.

2. The method according to claim 1, wherein sending the value of the presence element comprises sending the value of the presence element corresponding to the class recorded in the class sub-element to a watcher corresponding to the class recorded in the class sub-element.

3. The method according to claim 2, wherein the authentication configuration information is created on an XDM server via XCAP protocol; and
   wherein obtaining the authentication configuration information comprises obtaining the authentication configuration information on the XDM server via the XCAP protocol.

4. The method according to claim 1, wherein a flag indicating whether to provide a class is further configured in the right rule; and
   wherein, before sending the value of the presence element to the corresponding watcher, the method further comprises deleting or keeping class information contained in a presence information document according to the flag indicating whether to provide the class configured in the right rule.

5. The method according to claim 1, wherein a number of right rules for the watcher is at least two and wherein the method further comprises performing a logic OR or logic AND operation on the at least two right rules, and taking an obtained result as the right rule for the watcher.

6. The method according to claim 1, wherein the method further comprises receiving subscription information from the watcher, wherein the subscription information comprises filtering information for the class; and
   wherein, before sending the value of the presence element to the corresponding watcher, the method further comprises determining a presence element satisfying a filtering requirement according to the filtering information for the class and sending the presence element satisfying the filtering requirement.

7. A presence information processing device, comprising:
   a processor;
   a memory coupled to the processor in which a computer program is stored, the computer program including instructions that, when executed by the processor, cause the processor to:
      record a grouping result for watchers sent from a presentity client according to a right rule obtained from authentication configuration information, wherein the grouping result is described by a correlation included in the right rule between a watcher identity and a class of a group that the watcher identity pertains to;

determine which group a watcher allowed to obtain presence information pertains to according to the grouping result recorded after receiving the presence information, the presence information comprising different values of a presence element and classes corresponding to the values, wherein the classes are used to distinguish between different values of the presence element sent to different watchers;

determine whether class sub-elements contained in presence information issued by at least two different presence sources have the same value or no class sub-element is contained if the presence information processing device receives the presence information issued for one presentity by the at least two different presence sources; and merge the presence information issued by the different presence sources if the class sub-elements contained in the presence information issued by the different presence sources have the same value or no class sub-element is contained send a value of a presence element to a corresponding watcher according to a correlation between the class corresponding to the value in the presence information and the class derived from the right rule obtained from the authentication configuration information.

8. The device according to claim 7, wherein the computer program further includes instructions that, when executed by the processor, cause the processor to:
   configure a flag indicating whether to provide a class in the right rule; and
   delete or keep class information contained in a presence information document according to the flag before sending the value of the presence element to the corresponding watcher.

9. The device according to claim 7, wherein a number of right rules for the watcher is at least two, and the computer program further includes instructions that, when executed by the processor, cause the processor to perform a logic OR or logic AND operation on the at least two right rules and to take an obtained result as the right rule for the watcher.

10. The device according to claim 7, wherein the computer program further includes instructions that, when executed by the processor, cause the processor to:
   receive subscription information sent by the watcher, wherein the subscription information comprises filtering information for the class; determine a presence element satisfying a filtering requirement according to the filtering information for the class before sending the value of the presence element to the corresponding watcher; and
   send the presence element satisfying the filtering requirement.

* * * * *